US009928769B2

(12) United States Patent
Kuzuhara et al.

(10) Patent No.: US 9,928,769 B2
(45) Date of Patent: Mar. 27, 2018

(54) HEAD-UP DISPLAY AND VEHICLE EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 15/275,668

(22) Filed: Sep. 26, 2016

(65) Prior Publication Data

US 2017/0092169 A1 Mar. 30, 2017

(30) Foreign Application Priority Data

Sep. 29, 2015 (JP) ................................. 2015-190554
Sep. 15, 2016 (JP) ................................. 2016-180140

(51) Int. Cl.
*G09G 3/00* (2006.01)
*G02B 27/01* (2006.01)

(52) U.S. Cl.
CPC ......... *G09G 3/007* (2013.01); *G02B 27/0101* (2013.01); *G09G 3/002* (2013.01); *G02B 2027/014* (2013.01); *G02B 2027/0116* (2013.01); *G02B 2027/0118* (2013.01); *G09G 2320/02* (2013.01); *G09G 2354/00* (2013.01); *G09G 2380/10* (2013.01)

(58) Field of Classification Search
CPC .... G09G 3/007; G09G 2320/02; G09G 3/002; G02B 27/0101
See application file for complete search history.

(56) References Cited

U.S. PATENT DOCUMENTS

| 2001/0033440 | A1  | 10/2001 | Togino |                       |
|--------------|-----|---------|--------|-----------------------|
| 2002/0036750 | A1* | 3/2002  | Eberl  | A61B 3/12             |
|              |     |         |        | 351/207               |
| 2006/0132914 | A1* | 6/2006  | Weiss  | G02B 5/32             |
|              |     |         |        | 359/462               |
| 2008/0238814 | A1  | 10/2008 | Ishikawa et al. |              |

(Continued)

FOREIGN PATENT DOCUMENTS

| JP | 2001-330797 | 11/2001 |
| JP | 2008-268883 | 11/2008 |

(Continued)

*Primary Examiner* — Ricardo L Osorio
(74) *Attorney, Agent, or Firm* — Wenderoth, Lind & Ponack, L.L.P.

(57) ABSTRACT

A head-up display includes a display device, a CPU, and a projection optical system. The display device has pixels including a first-color subordinate pixel and a second-color subordinate pixel, and displays an image. The CPU controls display of the display device. The projection optical system has a refractive optical system, and projects the image displayed on display device on a viewpoint region of an observer. The CPU asymmetrically shifts, between the reference outer side image end and the reference inner side image end with reference to a center, a pixel of an image formed by the second-color subordinate pixel relative to an image formed by the first-color subordinate pixel.

7 Claims, 15 Drawing Sheets

(56) References Cited

U.S. PATENT DOCUMENTS

| | | | | |
|---|---|---|---|---|
| 2011/0128602 A1* | 6/2011 | Hamano | ............ | G02B 13/0005 |
| | | | | 359/205.1 |
| 2016/0334637 A1* | 11/2016 | Saisho | ............... | G02B 27/0101 |
| 2017/0269269 A1* | 9/2017 | Nagashima | ........... | G02B 5/1861 |
| 2017/0269354 A1* | 9/2017 | Suzuki | ..................... | G02B 5/18 |

FOREIGN PATENT DOCUMENTS

| | | |
|---|---|---|
| JP | 2009-122582 | 6/2009 |
| JP | 2011-43741 | 3/2011 |

\* cited by examiner

FIG. 8A

|  | SURFACE NUMBER | SHAPE | ECCENTRICITY DATA | | | | | |
|---|---|---|---|---|---|---|---|---|
|  |  |  | X | Y | Z | ADE | BDE | CDE |
| DISPLAY SURFACE | 1 |  | 0 | 0 | 0 | 0 | 0 | 0 |
| FIRST LENS | 2 | SPHERICAL SURFACE | 0 | 0 | -18.1558 | 0 | 0 | 0 |
|  | 3 | FREE-FORM SURFACE | 0 | 0 | -35.9296 | 0 | 0 | 0 |
| FIRST MIRROR | 4 | FREE-FORM SURFACE | -8.419 | 15.323 | -131.763 | 14.255 | 3.705 | -4.391 |
| SECOND LENS | 5 | FLAT | -24.832 | 63.931 | -69.616 | 65.773 | -1.373 | 98.212 |
|  | 6 | LINEAR FRESNEL | -24.7601 | 66.66559 | -68.3852 | 65.77343 | -1.37269 | 98.2124 |
| WINDSHIELD | 7 | FREE-FORM SURFACE | -19.812 | 164.654 | 90.232 | 160.032 | -16.343 | 4.059 |
| OBSERVER | 8 |  | -289.621 | -52.158 | 847.812 | 160.032 | -16.343 | 4.059 |

FIG. 8B

| SURFACE NUMBER | RADIUS OF CURVATURE |
|---|---|
| 2 | 68.2 |
| 3 | 345.3 |
| 4 | -2134.3 |
| 7 | -437.0 |

FIG. 8C

| SURFACE NUMBER | X RADIUS OF CURVATURE | Y RADIUS OF CURVATURE |
|---|---|---|
| 6 | -440.1 | -1000.0 |

FIG. 9A

| SURFACE NUMBER | POLYNOMIAL COEFFICIENT | | | | | | | |
|---|---|---|---|---|---|---|---|---|
| 3 | C1 | 0.000E+00 | C19 | 1.044E-08 | C37 | 0.000E+00 | C55 | 0.000E+00 |
| | C2 | 0.000E+00 | C20 | 5.388E-08 | C38 | 0.000E+00 | C56 | 0.000E+00 |
| | C3 | 0.000E+00 | C21 | 8.670E-08 | C39 | 0.000E+00 | C57 | 0.000E+00 |
| | C4 | 6.923E-04 | C22 | 6.490E-11 | C40 | 0.000E+00 | C58 | 0.000E+00 |
| | C5 | 5.595E-03 | C23 | -6.964E-11 | C41 | 0.000E+00 | C59 | 0.000E+00 |
| | C6 | 2.590E-03 | C24 | 4.962E-11 | C42 | 0.000E+00 | C60 | 0.000E+00 |
| | C7 | -1.192E-06 | C25 | 2.004E-10 | C43 | 0.000E+00 | C61 | 0.000E+00 |
| | C8 | -2.668E-05 | C26 | 7.675E-10 | C44 | 0.000E+00 | C62 | 0.000E+00 |
| | C9 | -4.740E-05 | C27 | -9.023E-10 | C45 | 0.000E+00 | C63 | 0.000E+00 |
| | C10 | -1.251E-04 | C28 | -3.652E-09 | C46 | 0.000E+00 | C64 | 0.000E+00 |
| | C11 | 2.266E-07 | C29 | 0.000E+00 | C47 | 0.000E+00 | C65 | 0.000E+00 |
| | C12 | -6.635E-07 | C30 | 0.000E+00 | C48 | 0.000E+00 | C66 | 0.000E+00 |
| | C13 | -1.257E-06 | C31 | 0.000E+00 | C49 | 0.000E+00 | | |
| | C14 | -1.048E-07 | C32 | 0.000E+00 | C50 | 0.000E+00 | | |
| | C15 | 6.592E-06 | C33 | 0.000E+00 | C51 | 0.000E+00 | | |
| | C16 | 4.297E-09 | C34 | 0.000E+00 | C52 | 0.000E+00 | | |
| | C17 | -2.125E-09 | C35 | 0.000E+00 | C53 | 0.000E+00 | | |
| | C18 | -3.282E-10 | C36 | 0.000E+00 | C54 | 0.000E+00 | | |
| 4 | C1 | 0.000E+00 | C19 | -1.938E-10 | C37 | 0.000E+00 | C55 | 0.000E+00 |
| | C2 | 0.000E+00 | C20 | -1.350E-10 | C38 | 0.000E+00 | C56 | 0.000E+00 |
| | C3 | 0.000E+00 | C21 | -2.438E-10 | C39 | 0.000E+00 | C57 | 0.000E+00 |
| | C4 | 1.479E-03 | C22 | 4.115E-14 | C40 | 0.000E+00 | C58 | 0.000E+00 |
| | C5 | -2.452E-04 | C23 | 3.235E-13 | C41 | 0.000E+00 | C59 | 0.000E+00 |
| | C6 | 1.064E-03 | C24 | -2.953E-13 | C42 | 0.000E+00 | C60 | 0.000E+00 |
| | C7 | -1.077E-07 | C25 | -7.097E-13 | C43 | 0.000E+00 | C61 | 0.000E+00 |
| | C8 | -1.835E-06 | C26 | 1.272E-13 | C44 | 0.000E+00 | C62 | 0.000E+00 |
| | C9 | 1.919E-06 | C27 | 2.636E-12 | C45 | 0.000E+00 | C63 | 0.000E+00 |
| | C10 | 2.165E-06 | C28 | -5.372E-12 | C46 | 0.000E+00 | C64 | 0.000E+00 |
| | C11 | 2.122E-09 | C29 | 4.833E-16 | C47 | 0.000E+00 | C65 | 0.000E+00 |
| | C12 | 4.357E-09 | C30 | 1.794E-15 | C48 | 0.000E+00 | C66 | 0.000E+00 |
| | C13 | 1.713E-08 | C31 | 8.769E-16 | C49 | 0.000E+00 | | |
| | C14 | -8.405E-11 | C32 | 4.862E-15 | C50 | 0.000E+00 | | |
| | C15 | -1.261E-08 | C33 | 1.006E-14 | C51 | 0.000E+00 | | |
| | C16 | -2.635E-11 | C34 | 4.066E-15 | C52 | 0.000E+00 | | |
| | C17 | -4.782E-11 | C35 | -1.744E-14 | C53 | 0.000E+00 | | |
| | C18 | -7.729E-11 | C36 | 8.868E-14 | C54 | 0.000E+00 | | |

FIG. 9B

SURFACE NUMBER

| | POLYNOMIAL COEFFICIENT | | | | | | | |
|---|---|---|---|---|---|---|---|---|
| 7 | C1 | 0.000E+00 | C19 | 1.510E-12 | C37 | 1.800E-21 | C55 | 0.000E+00 |
| | C2 | 1.934E-01 | C20 | 6.210E-12 | C38 | 1.600E-21 | C56 | 0.000E+00 |
| | C3 | 1.755E+00 | C21 | 1.000E-11 | C39 | -1.240E-20 | C57 | 0.000E+00 |
| | C4 | 8.253E-04 | C22 | 4.270E-15 | C40 | 7.840E-21 | C58 | 0.000E+00 |
| | C5 | -8.580E-06 | C23 | -3.900E-15 | C41 | -2.190E-20 | C59 | 0.000E+00 |
| | C6 | 3.263E-04 | C24 | 5.780E-15 | C42 | -5.710E-20 | C60 | 0.000E+00 |
| | C7 | 5.360E-08 | C25 | -1.460E-14 | C43 | 5.620E-20 | C61 | 0.000E+00 |
| | C8 | 5.800E-08 | C26 | 6.040E-15 | C44 | 8.070E-23 | C62 | 0.000E+00 |
| | C9 | 1.490E-07 | C27 | 4.910E-15 | C45 | -3.960E-21 | C63 | 0.000E+00 |
| | C10 | 1.140E-06 | C28 | -2.710E-14 | C46 | 0.000E+00 | C64 | 0.000E+00 |
| | C11 | 1.460E-09 | C29 | -1.110E-18 | C47 | 0.000E+00 | C65 | 0.000E+00 |
| | C12 | 1.160E-11 | C30 | 4.430E-18 | C48 | 0.000E+00 | C66 | 0.000E+00 |
| | C13 | 2.540E-09 | C31 | 3.850E-17 | C49 | 0.000E+00 | | |
| | C14 | -8.850E-10 | C32 | 9.940E-17 | C50 | 0.000E+00 | | |
| | C15 | -9.760E-10 | C33 | 2.290E-17 | C51 | 0.000E+00 | | |
| | C16 | 8.380E-14 | C34 | -5.390E-17 | C52 | 0.000E+00 | | |
| | C17 | -6.970E-14 | C35 | -4.830E-17 | C53 | 0.000E+00 | | |
| | C18 | 3.710E-13 | C36 | 3.040E-17 | C54 | 0.000E+00 | | |

FIG. 9C

| SURFACE NUMBER | ASPHERIC COEFFICIENT | |
|---|---|---|
| 6 | K | 2.43606212 |
| | C4 | 2.2264E-06 |
| | C5 | 6.0628E-09 |
| | C6 | 2.3750E-11 |
| | C7 | 5.5567E-13 |
| | C8 | 1.3699E-15 |
| | C9 | -1.4854E-17 |
| | C10 | -5.8024E-20 |
| | C11 | 2.8936E-22 |

FIG. 10A

|  | SURFACE NUMBER | SHAPE | ECCENTRICITY DATA ||||||
|---|---|---|---|---|---|---|---|---|
|  |  |  | X | Y | Z | ADE | BDE | CDE |
| DISPLAY SURFACE | 1 |  | 0 | 0 | 0 | 0 | 0 | 0 |
| FIRST MIRROR | 2 | FREE-FORM SURFACE | 21.690 | -47.566 | 135.249 | -44.294 | -14.947 | -11.590 |
| SECOND MIRROR | 3 | FREE-FORM SURFACE | -0.517 | 14.952 | 112.929 | -96.251 | -1.101 | -17.399 |
| SECOND LENS | 4 | FLAT | 21.690 | -47.566 | 135.249 | -44.294 | -14.947 | -11.590 |
|  | 5 | LINEAR FRESNEL | -0.517 | 14.952 | 112.929 | -96.251 | -1.101 | -17.399 |
| WINDSHIELD | 6 | FREE-FORM SURFACE | -91.155 | -291.389 | -34.731 | -62.272 | -13.415 | -21.310 |
| OBSERVER | 7 |  | -464.001 | -388.504 | -734.301 | 8.124 | -27.788 | 11.988 |

FIG. 10B

| SURFACE NUMBER | RADIUS OF CURVATURE |
|---|---|
| 2 | 792.5 |
| 3 | -2184.2 |
| 6 | -437.0 |

FIG. 10C

| SURFACE NUMBER | X RADIUS OF CURVATURE | Y RADIUS OF CURVATURE |
|---|---|---|
| 5 | -431.7 | -846.4 |

FIG. 11A

| SURFACE NUMBER | POLYNOMIAL COEFFICIENT | | | | | | | | |
|---|---|---|---|---|---|---|---|---|---|
| 2 | C1 | 0.000E+00 | C19 | -6.017E-10 | C37 | 0.000E+00 | C55 | 0.000E+00 |
| | C2 | 0.000E+00 | C20 | -3.555E-10 | C38 | 0.000E+00 | C56 | 0.000E+00 |
| | C3 | 0.000E+00 | C21 | 2.097E-11 | C39 | 0.000E+00 | C57 | 0.000E+00 |
| | C4 | 4.538E-04 | C22 | 0.000E+00 | C40 | 0.000E+00 | C58 | 0.000E+00 |
| | C5 | 8.543E-05 | C23 | 0.000E+00 | C41 | 0.000E+00 | C59 | 0.000E+00 |
| | C6 | -1.277E-03 | C24 | 0.000E+00 | C42 | 0.000E+00 | C60 | 0.000E+00 |
| | C7 | 4.051E-06 | C25 | 0.000E+00 | C43 | 0.000E+00 | C61 | 0.000E+00 |
| | C8 | 2.178E-05 | C26 | 0.000E+00 | C44 | 0.000E+00 | C62 | 0.000E+00 |
| | C9 | 2.314E-05 | C27 | 0.000E+00 | C45 | 0.000E+00 | C63 | 0.000E+00 |
| | C10 | 2.079E-05 | C28 | 0.000E+00 | C46 | 0.000E+00 | C64 | 0.000E+00 |
| | C11 | -3.932E-08 | C29 | 0.000E+00 | C47 | 0.000E+00 | C65 | 0.000E+00 |
| | C12 | 1.811E-07 | C30 | 0.000E+00 | C48 | 0.000E+00 | C66 | 0.000E+00 |
| | C13 | -5.317E-08 | C31 | 0.000E+00 | C49 | 0.000E+00 | | |
| | C14 | -3.578E-07 | C32 | 0.000E+00 | C50 | 0.000E+00 | | |
| | C15 | -2.477E-07 | C33 | 0.000E+00 | C51 | 0.000E+00 | | |
| | C16 | 1.449E-10 | C34 | 0.000E+00 | C52 | 0.000E+00 | | |
| | C17 | 3.296E-10 | C35 | 0.000E+00 | C53 | 0.000E+00 | | |
| | C18 | -1.234E-10 | C36 | 0.000E+00 | C54 | 0.000E+00 | | |
| 3 | C1 | 0.000E+00 | C19 | -5.781E-11 | C37 | 0.000E+00 | C55 | 0.000E+00 |
| | C2 | 0.000E+00 | C20 | 1.090E-10 | C38 | 0.000E+00 | C56 | 0.000E+00 |
| | C3 | 0.000E+00 | C21 | 1.269E-10 | C39 | 0.000E+00 | C57 | 0.000E+00 |
| | C4 | 1.307E-03 | C22 | 8.476E-14 | C40 | 0.000E+00 | C58 | 0.000E+00 |
| | C5 | -6.816E-05 | C23 | 2.013E-13 | C41 | 0.000E+00 | C59 | 0.000E+00 |
| | C6 | 8.612E-04 | C24 | -9.694E-14 | C42 | 0.000E+00 | C60 | 0.000E+00 |
| | C7 | -1.925E-07 | C25 | -7.516E-15 | C43 | 0.000E+00 | C61 | 0.000E+00 |
| | C8 | -1.154E-06 | C26 | -6.546E-13 | C44 | 0.000E+00 | C62 | 0.000E+00 |
| | C9 | 1.559E-06 | C27 | -1.275E-12 | C45 | 0.000E+00 | C63 | 0.000E+00 |
| | C10 | 1.628E-06 | C28 | -1.880E-13 | C46 | 0.000E+00 | C64 | 0.000E+00 |
| | C11 | -2.334E-10 | C29 | 2.068E-16 | C47 | 0.000E+00 | C65 | 0.000E+00 |
| | C12 | 4.536E-09 | C30 | 1.460E-18 | C48 | 0.000E+00 | C66 | 0.000E+00 |
| | C13 | 7.942E-09 | C31 | -9.577E-16 | C49 | 0.000E+00 | | |
| | C14 | -1.322E-08 | C32 | 2.717E-15 | C50 | 0.000E+00 | | |
| | C15 | -1.782E-08 | C33 | 2.459E-15 | C51 | 0.000E+00 | | |
| | C16 | -5.785E-12 | C34 | 1.067E-14 | C52 | 0.000E+00 | | |
| | C17 | -8.322E-13 | C35 | 1.447E-15 | C53 | 0.000E+00 | | |
| | C18 | -5.379E-12 | C36 | -1.943E-14 | C54 | 0.000E+00 | | |

FIG. 11B

| Surface Number | POLYNOMIAL COEFFICIENT | | | | | | | | |
|---|---|---|---|---|---|---|---|---|---|
| 6 | C1 | 0.000E+00 | C19 | 1.510E-12 | C37 | 1.800E-21 | C55 | 0.000E+00 |
| | C2 | 1.934E-01 | C20 | 6.210E-12 | C38 | 1.600E-21 | C56 | 0.000E+00 |
| | C3 | 1.755E+00 | C21 | 1.000E-11 | C39 | -1.240E-20 | C57 | 0.000E+00 |
| | C4 | 8.253E-04 | C22 | 4.270E-15 | C40 | 7.840E-21 | C58 | 0.000E+00 |
| | C5 | -8.580E-06 | C23 | -3.900E-15 | C41 | -2.190E-20 | C59 | 0.000E+00 |
| | C6 | 3.263E-04 | C24 | 5.780E-15 | C42 | -5.710E-20 | C60 | 0.000E+00 |
| | C7 | 5.360E-08 | C25 | -1.460E-14 | C43 | 5.620E-20 | C61 | 0.000E+00 |
| | C8 | 5.800E-08 | C26 | 6.040E-15 | C44 | 8.070E-23 | C62 | 0.000E+00 |
| | C9 | 1.490E-07 | C27 | 4.910E-15 | C45 | -3.960E-21 | C63 | 0.000E+00 |
| | C10 | 1.140E-06 | C28 | -2.710E-14 | C46 | 0.000E+00 | C64 | 0.000E+00 |
| | C11 | 1.460E-09 | C29 | -1.110E-18 | C47 | 0.000E+00 | C65 | 0.000E+00 |
| | C12 | 1.160E-11 | C30 | 4.430E-18 | C48 | 0.000E+00 | C66 | 0.000E+00 |
| | C13 | 2.540E-09 | C31 | 3.850E-17 | C49 | 0.000E+00 | | |
| | C14 | -8.850E-10 | C32 | 9.940E-17 | C50 | 0.000E+00 | | |
| | C15 | -9.760E-10 | C33 | 2.290E-17 | C51 | 0.000E+00 | | |
| | C16 | 8.380E-14 | C34 | -5.390E-17 | C52 | 0.000E+00 | | |
| | C17 | -6.970E-14 | C35 | -4.830E-17 | C53 | 0.000E+00 | | |
| | C18 | 3.710E-13 | C36 | 3.040E-17 | C54 | 0.000E+00 | | |

FIG. 11C

| SURFACE NUMBER | ASPHERIC COEFFICIENT | |
|---|---|---|
| 5 | K | 2.871282174 |
| | C4 | 2.4237E-06 |
| | C5 | 7.1605E-09 |
| | C6 | 2.9376E-12 |
| | C7 | 3.5055E-13 |
| | C8 | 6.1372E-16 |
| | C9 | -1.8863E-18 |
| | C10 | -1.5998E-20 |
| | C11 | 7.6936E-23 |

FIG. 12

|  |  | EXAMPLE 1 | EXAMPLE 2 |
|---|---|---|---|
| VIRTUAL IMAGE SIZE | X | 420.0 | 1000.0 |
|  | Y | 157.5 | 300.0 |
| DISTANCE BETWEEN OBSERVER AND VIRTUAL IMAGE |  | 2100.0 | 5000.0 | ns a virtual image.
HEAD-UP DISPLAY AND VEHICLE EQUIPPED WITH HEAD-UP DISPLAY

BACKGROUND

1. Technical Field

The present disclosure relates to a head-up display that projects on a transparent reflective member thereby presenting a virtual image.

2. Description of the Related Art

A head-up display apparatus disclosed in Unexamined Japanese Patent Publication No. 2009-122582 includes a projection optical system and a windshield. The projection optical system generates display light that has information of an image, and enlarges and projects the display light. The windshield reflects the display light and thereby displays a virtual image. The projection optical system includes a liquid crystal panel, a projection lens group, a concave mirror and the like. The liquid crystal panel generates display light. The projection lens group has positive power. The concave mirror is a rotationally asymmetrical aspherical concave mirror that is eccentrically disposed relative to the projection lens group. The projection optical system enlarges and projects the display light output from the liquid crystal panel while sharing power between the projection lens group and the concave mirror.

SUMMARY

A head-up display of the present disclosure is mounted on a vehicle having a windshield, and projects an image on the windshield to allow the observer to visually recognize a virtual image. The head-up display includes a display device, a processor, and a projection optical system. The display device has pixels including a first-color subordinate pixel and a second-color subordinate pixel, and displays an image. The processor controls display of the display device. The projection optical system has a refractive optical system, and projects the image displayed on the display device on a viewpoint region of the observer. Here, a deflection angle of a beam at a reference outer side image end passing through an outer side in the refractive optical system with reference to the vehicle and a deflection angle of a beam at a reference inner side image end passing through an inner side differ from each other. Note that, the deflection angle is an angle between a vector of a beam input to the refractive optical system and a vector of the beam output therefrom. The processor asymmetrically shifts, between the reference outer side image end and the reference inner side image end with reference to a center, a pixel of an image by the second-color subordinate pixel relative to an image by the first-color subordinate pixel.

The head-up display of the present disclosure effectively suppresses a degradation in visibility.

BRIEF DESCRIPTION OF THE DRAWINGS

FIG. 8A is a table showing data of a projection optical system of Example 1;

FIG. 8B is a table showing data of the projection optical system of Example 1;

FIG. 8C is a table showing data of the projection optical system of Example 1;

FIG. 9A is a table showing data of the projection optical system of Example 1;

FIG. 9B is a table showing data of the projection optical system of Example 1;

FIG. 9C is a table showing data of the projection optical system of Example 1;

FIG. 10A is a table showing data of a projection optical system of Example 2;

FIG. 10B is a table showing data of the projection optical system of Example 2;

FIG. 10C is a table showing data of the projection optical system of Example 2;

FIG. 11A is a table showing data of the projection optical system of Example 2;

FIG. 11B is a table showing data of the projection optical system of Example 2;

FIG. 11C is a table showing data of the projection optical system of Example 2; and FIG. 12 is a table showing optical data of Examples 1 and 2.

DETAILED DESCRIPTION

In the following, with reference to the drawings as appropriate, a detailed description will be given of exemplary embodiments. Note that, an excessively detailed description may be omitted. For example, a detailed description of a well-known matter or a repetitive description of substantially identical structures may be omitted. This is to avoid unnecessary redundancy in the following description, and to facilitate understanding of a person skilled in the art.

Note that, the accompanying drawings and the following description are provided for a person skilled in the art to fully understand the present disclosure, and they are not intended to limit the subject disclosed in the scope of claims.

First Exemplary Embodiment

In the following, with reference to FIGS. 1 to 6, a first exemplary embodiment will be described.

[1-1. Structure]

[1-1-1. Overall Structure of Head-Up Display]

In the following, with reference to the drawings, a description will be given of specific exemplary embodiments and Examples of head-up display 100 of the present disclosure.

Figure 1:
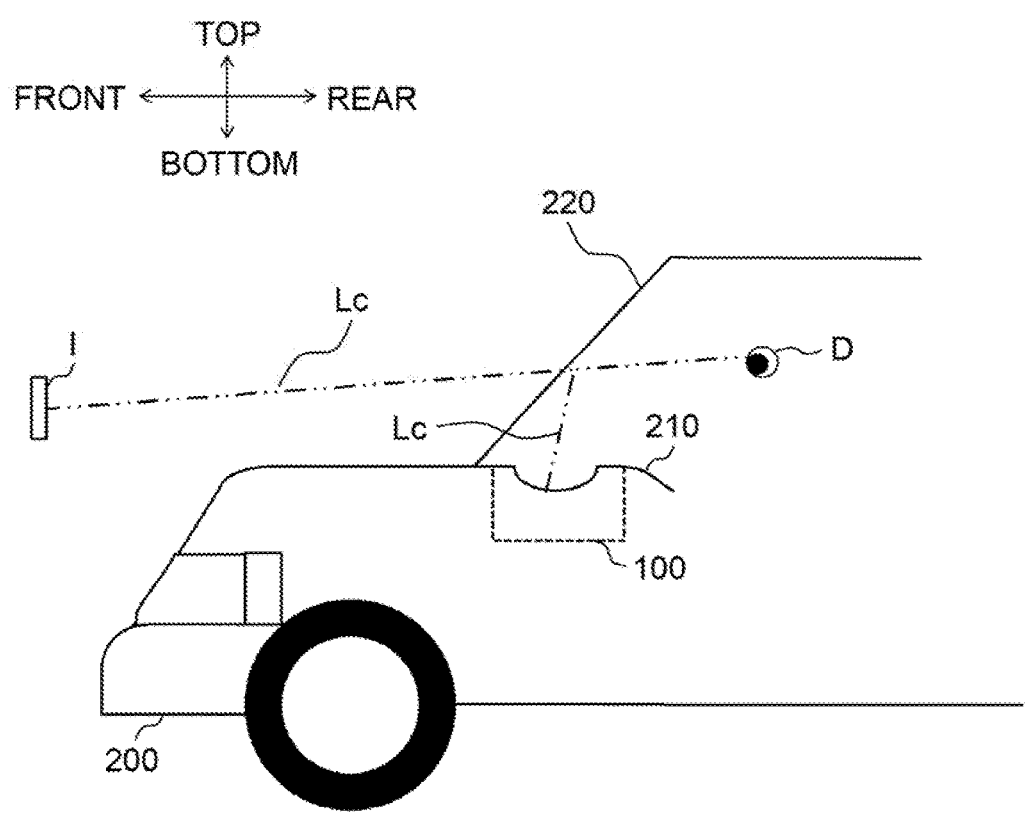
FIG. 1 is a schematic diagram showing a vehicle equipped with a head-up display according to a first exemplary embodiment.

FIG. 1 is a diagram showing vehicle 200 equipped with head-up display 100 according to the present exemplary embodiment. As shown in FIG. 1, head-up display 100 is disposed inside dashboard 210 provided below windshield 220 of vehicle 200. Observer D recognizes displayed image 111 (FIG. 2) which is projected by head-up display 100 on windshield 220 as virtual image I.

Figure 2:
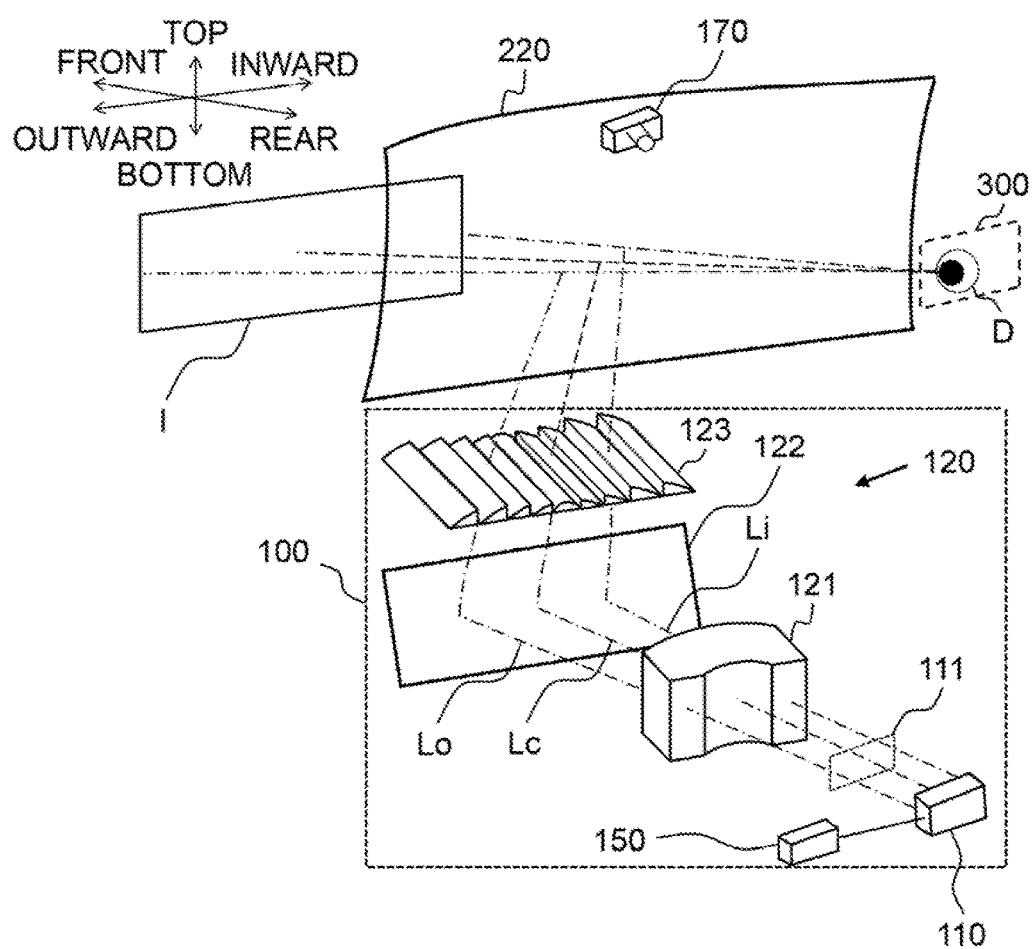
FIG. 2 is a schematic diagram showing the structure of the head-up display according to the first exemplary embodiment.

FIG. 2 is a schematic diagram for describing the structure of head-up display 100 according to the first exemplary embodiment. As shown in FIG. 2, head-up display 100 includes display device 110, projection optical system 120 (first lens 121, mirror 122, second lens 123), controller 150, and camera 170. Head-up display 100 reflects displayed image 111 displayed by display device 110 with windshield 220 thereby guiding displayed image 111 to viewpoint region 300 of observer D so that observer D visually recognizes virtual image I. Viewpoint region 300 refers to the region in which observer D can visually recognize complete virtual image I. Camera 170 detects the viewpoint position of observer D.

Here, a beam that is output from the center of virtual image I in the optical path of displayed image 111 is defined as reference beam Lc. Reference beam Lc visually recognized by observer D actually reaches observer D from display device 110 via the optical system. Accordingly, a beam from display device 110 to observer D that corresponds to reference beam Lc output from the center of virtual image I is also referred to as reference beam Lc. Further, an optical path that corresponds to these beams is also referred to as reference beam Lc. The same holds true for reference inner side beam Li and reference outer side beam Lo which are described in the following. An optical path of displayed image 111 that forms the vehicularly outer side end of virtual image I is defined as reference outer side beam Lo. An optical path of displayed image 111 that forms the vehicularly inner side end of virtual image I is defined as reference inner side beam Li. Note that, it is assumed that the viewpoint of observer D is at the center of viewpoint region 300.

Figure 3:
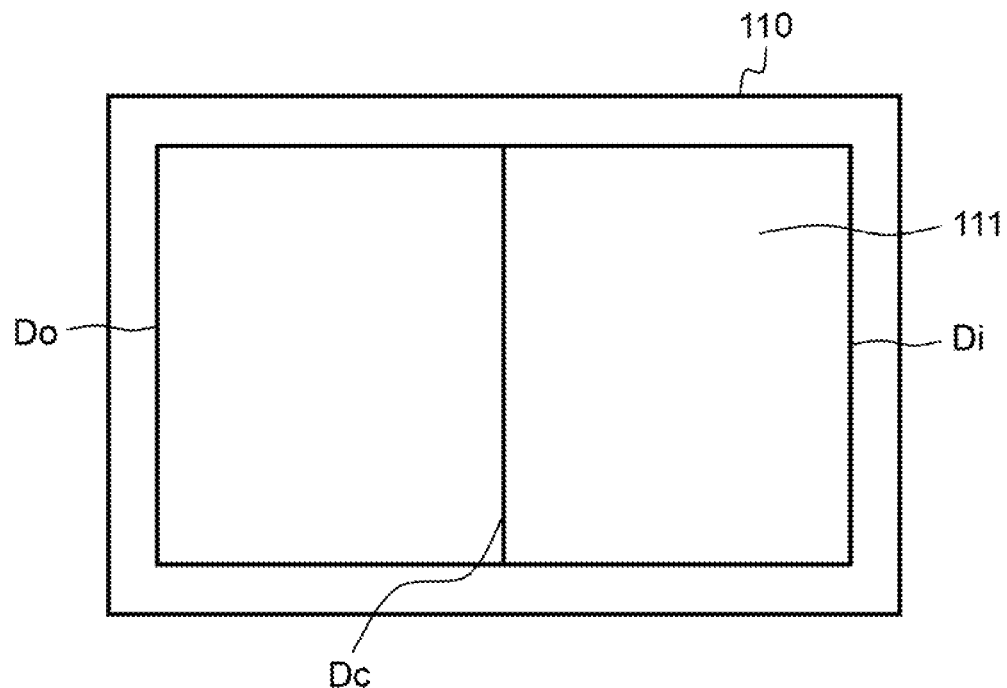
FIG. 3 is a schematic diagram for describing a displayed image on a display device according to the first exemplary embodiment.

FIG. 3 is a schematic diagram for describing display device 110 used in head-up display 100 according to the present exemplary embodiment. Display device 110 displays, within its displaying region, displayed image 111. In the first exemplary embodiment, displayed image 111 is a rectangle formed by long sides and short sides. Out of the two short sides, display positions respectively corresponding to reference outer side beam Lo and reference inner side beam Li are defined as reference outer side image end Do and reference inner side image end Di. Further, a position corresponding to reference beam Lc is defined as reference image Dc.

Display device 110 is just required to be capable of displaying an image. For example, a liquid crystal display apparatus (a liquid crystal display), an organic light emitting diode (an electroluminescence), a plasma display or the like may be used. Further, as display device 110, using a projector or a scanning laser, an image may be formed on a screen on which enlargement and reflection are enabled. Display device 110 according to the present exemplary embodiment has pixels which are formed by subordinate pixels in three colors, namely, R (red), G (green), B (blue).

Figure 4:
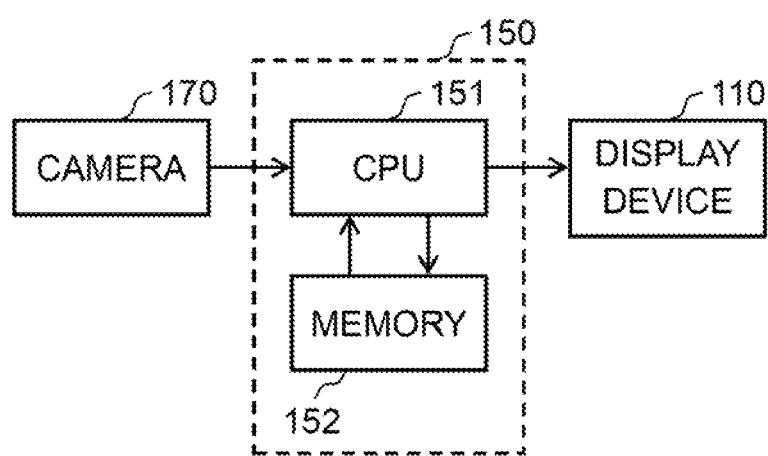
FIG. 4 is a block diagram for describing the electrical connection state of a controller according to the first exemplary embodiment.

FIG. 4 is a block diagram showing the electrical connection state of controller 150 according to the present exemplary embodiment. As shown in FIG. 4, controller 150 includes CPU 151 and memory 152. CPU 151 controls display device 110, to generate displayed image 111. Displayed image 111 can display various information, for example, road traffic navigation display, the distance to a vehicle ahead, the remaining battery charge of the vehicle, and the current vehicle speed. Memory 152 stores a correction amount parameter for electronically correcting colors of displayed image 111 displayed by display device 110, in accordance with the power of windshield 220 and that of projection optical system 120. The correction amount parameter is a shift-distance of a subordinate pixel relative to other subordinate pixel of a specific color, which is set based on the shape of second lens 123 which is designed in accordance with the shape of windshield 220. Further, memory 152 stores a correction amount parameter for electronically correcting colors of displayed image 111 displayed by display device 110, in accordance with the viewpoint position of observer D.

Controller 150 previously electronically distorts displayed image 111 in accordance with distortion that occurs at projection optical system 120 and windshield 220, thereby allowing observer D to visually recognize excellent virtual image I. Further, display device 110 displays display pixels of a plurality of wavelengths as being shifted for each display position based on the correction amount parameter previously stored in memory 152, in accordance with chromatic aberration that occurs at projection optical system 120. Further, display device 110 is also capable of displaying display pixels of a plurality of wavelengths as being shifted for each display position, in accordance with the viewpoint position of observer D detected by camera 170.

Projection optical system 120 is structured by first lens 121, mirror 122, and second lens 123. Projection optical system 120 projects displayed image 111 displayed by display device 110 on windshield 220. Specifically, image light of displayed image 111 displayed by display device 110 is input to mirror 122 via first lens 121. Image light reflected by mirror 122 is projected on windshield 220 via second lens 123.

[1-1-2. Structure of Projection Optical System]

Figure 5:
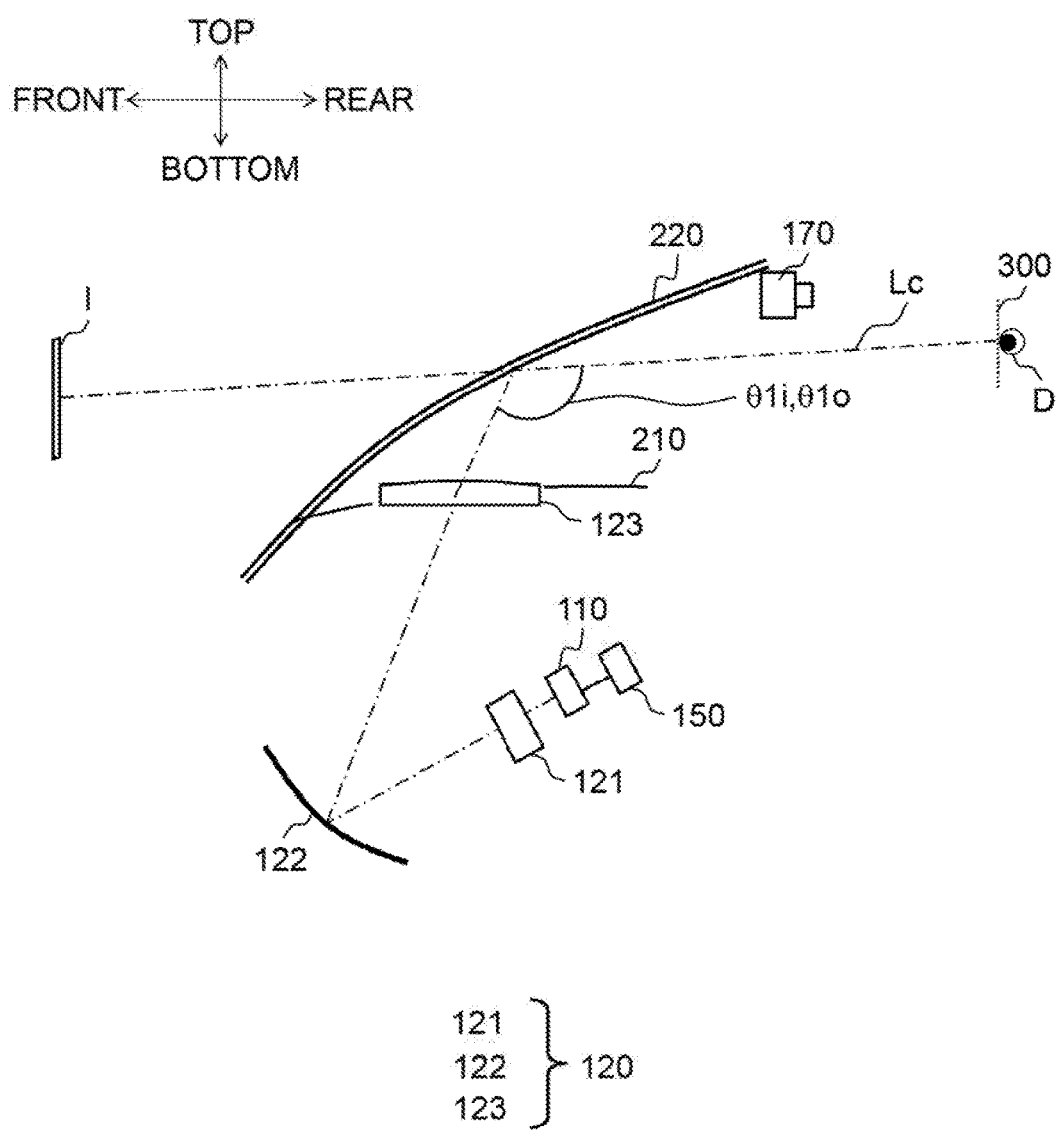
FIG. 5 is a schematic diagram for describing the structure of the head-up display according to the first exemplary embodiment.

In the following, with reference to FIG. 5, a description will be given of the disposition and structure of projection optical system 120.

First lens 121 is disposed on the front side of vehicle 200 relative to display device 110, as being inclined relative to the direction perpendicular to the display surface of display device 110. As a whole, first lens 121 has negative power. In this manner, the angle of a beam output from display device 110 can be reduced. Further, first lens 121 has concavity on display device 110 side, that is, at the input surface. This reduces the input angle of a beam, which has been output from display device 110, to the surface of first lens 121 on display device 110 side, whereby the influence of distortion due to eccentricity is suppressed. Further, first lens 121 is a negative meniscus lens which has convexity at the output surface. This reduces the input angle of a beam, which has been output from display device 110, to the lens surface of first lens 121, whereby the influence of distortion due to eccentricity is suppressed. Further, a free-form surface is employed for at least one of the surfaces of first lens 121. Thus, asymmetric screen distortion that occurs at mirror 122, second lens 123, and windshield 220 can be corrected in an excellent manner.

Mirror 122 is disposed on the front side of vehicle 200 relative to first lens 121, having its reflection surface eccentrically disposed so as to reflect the beam output from first lens 121 toward second lens 123. Here, the reflection surface of mirror 122 is concave. Thus, displayed image 111 displayed by display device 110 can be enlarged and visually recognized as virtual image I by observer D. Further, a free-form surface is employed for mirror 122. This is to correct distortion of a virtual image due to reflection, so that excellent virtual image I can be observed over the entire region of viewpoint region 300.

Figure 6:
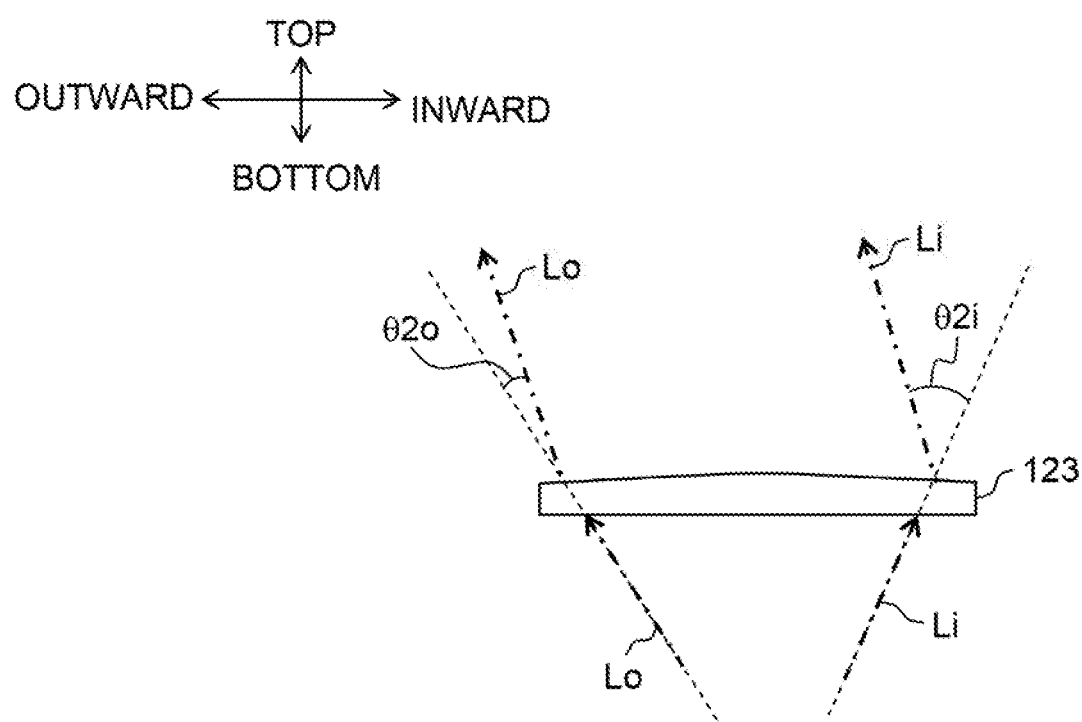
FIG. 6 is a schematic diagram for describing a second mirror according to the first exemplary embodiment.

Second lens 123 is a Fresnel lens having positive power, and is disposed above mirror 122. Second lens 123 refracts the beam reflected by mirror 122 toward windshield 220. Further, as shown in FIG. 6, second lens 123 of the present exemplary embodiment is an asymmetric lens whose refractive effect is greater in the vehicularly inner direction than in the vehicularly outer direction. Second lens 123 according to the present exemplary embodiment is an asymmetric lens provided with a greater sag on the vehicularly inner side so that power increases. On the other hand, second lens 123 may be a rotationally symmetric lens having its rotational symmetry axis shifted to the vehicularly outer side so that power largely increases in the vehicularly outer direction.

Disposing second lens 123 of positive power enables displayed image 111 displayed by display device 110 to be enlarged and visually recognized as virtual image I by observer D. Further, mirror 122 can be downsized. Further, by virtue of second lens 123 having the refractive effect which is greater in the vehicularly inner direction than in the vehicularly outer direction, second lens 123 can be disposed almost horizontally. This allows downsizing of the housing of head-up display 100. Normally, a windshield has a free-form surface with a greater curvature on the vehicularly outer side. Providing great power on the vehicularly inner side of second lens 123, second lens 123 can be disposed almost horizontally while asymmetric distortion is corrected.

Further, the output surface of second lens 123 has a Fresnel facet. This Fresnel facet has ridges that linearly extend in the front-rear direction of vehicle 200. This reduces the thickness of second lens 123, whereby a downsizing of head-up display 100 is realized. Further, second lens 123 has a curvature which is greater in the right-left direction of the vehicle than in the front-rear direction of the vehicle. This enables correction of asymmetric distortion that occurs at mirror 122 and windshield 220.

In projection optical system 120, since first lens 121 of negative power as a whole is disposed on the next to output side of display device 110, the power of mirror 122 can be increased (a so-called telephoto effect). Thus, head-up display 100 can be downsized. Here, first lens 121 is disposed to be higher than the lower end of the reflection surface of mirror 122. This allows head-up display 100 to reduce thickness in the top-bottom direction of vehicle 200. Further, the distance on the path of reference beam Lc, between display device 110 and first lens 121 is shorter than the distance between mirror 122 and first lens 121. This suppresses the amount of chromatic aberration that occurs at first lens 121 from fluctuating in viewpoint region 300.

[1-1-3. Electronical Correction]

Since the refractive effect is greater in the vehicularly inner direction than in the vehicularly outer direction, chromatic aberration that occurs at second lens 123 becomes greater on the vehicularly inner side than on the vehicularly outer side. Accordingly, virtual image I is visually recognized by observer D as an image with asymmetric chromatic aberration.

Then, CPU 151 refers to the correction parameter stored in memory 152, and controls display device 110 to display displayed image 111 while displacing the display position by pixels in the number corresponding to the correction amount which is determined for each wavelength. Here, pixels of two or more wavelengths in displayed image 111 are shifted for correction. Specifically, with reference to a green-color image formed just by a green-color subordinate pixel, a red-color subordinate pixel and a blue-color subordinate pixel are shifted. Here, red-color and blue-color are shifted in opposite directions with reference to green-color. Further, the blue-color subordinate pixel is greater in shift-distance than the red-color subordinate pixel. Further, memory 152 has a correction amount parameter which is greater toward the periphery from the center of displayed image 111. That is, memory 152 has a correction amount parameter which is corresponding to refraction amount at the position where displayed image 111 passes in second lens 123. In the present exemplary embodiment, memory 152 has a correction amount parameter which is asymmetric between the vehicularly outer side and the vehicularly inner side relative to the center of displayed image 111. That is, in displayed image 111, the shift-distance is greater at reference inner side image end Di than at reference outer side image end Do. Thus, even when asymmetric chromatic aberration occurs at second lens 123, excellent virtual image I with reduced chromatic aberration can be visually recognized by observer D.

Further, memory 152 has a correction amount parameter that corresponds to the position of the viewpoint of observer D in viewpoint region 300. That is, memory 152 has a correction amount parameter with which the shift-distance of reference inner side image end Di increases and the shift-distance of reference outer side image end Do reduces when the viewpoint of observer D is positioned on the inner side in vehicle 200. Conversely, with the correction amount parameter, the shift-distance of reference inner side image end Di reduces and the shift-distance of reference outer side image end Do increases when the viewpoint of observer D is on the outer side in vehicle 200. Thus, even when the position of the viewpoint of observer D changes, excellent virtual image I can be visually recognized by observer D.

[1-2. Effect and Others]

Head-up display 100 according to the first exemplary embodiment projects on windshield 220 of vehicle 200, so as to allow observer D to visually recognize virtual image I. Head-up display 100 includes display device 110, CPU 151, first lens 121, second lens 123, and mirror 122. Display device 110 has pixels which are formed by subordinate pixels of a plurality of colors, and displays displayed image 111. CPU 151 controls display of display device 110. Here, in second lens 123 being a refractive optical system, a deflection angle of a beam at reference outer side image end Do that passes through second lens 123 on the outer side in vehicle 200 and a deflection angle of a beam at reference inner side image end Di that passes through second lens 123 on the inner side in vehicle 200 differ from each other. Note that, the deflection angle in second lens 123 is an angle between a vector of a beam input to second lens 123 and a vector of the beam output from second lens 123. CPU 151 displays displayed image 111 while displacing asymmetrically, between the right side and the left side of displayed image 111, a red-color image and a blue-color image with reference to a green-color image.

This makes it possible to present virtual image I with reduced chromatic aberration over the entire region of viewpoint region 300.

Further, first lens 121 of head-up display 100 according to the first exemplary embodiment has negative power as a whole. This reduces the angle of a beam output from display device 110, whereby a high-contrast image can be visually recognized over the entire region of viewpoint region 300.

Still further, head-up display 100 according to the first exemplary embodiment includes first lens 121 having concavity on display device 110 side. This reduces an input angle of a beam having been output from display device 110 to the surface of first lens 121 on display device 110 side, whereby screen distortion can be corrected in an excellent manner.

Still further, head-up display 100 according to the first exemplary embodiment includes first lens 121 in which power is greater in the long-side direction of displayed image 111 than in the short-side direction of displayed image 111. Thus, a high-contrast image can be visually recognized over the entire region of viewpoint region 300 which is set to be laterally longer.

Second lens 123 of head-up display 100 according to the first exemplary embodiment is desirably disposed as being inclined relative to reference beam Lc. Thus, second lens 123 can be disposed almost horizontally, whereby head-up display 100 can be downsized.

Second lens 123 of head-up display 100 according to the first exemplary embodiment is desirably a linear Fresnel lens having grooves in the vehicularly right-left direction. This reduces the thickness of second lens 123, whereby head-up display 100 can be downsized.

Second lens 123 of head-up display 100 according to the first exemplary embodiment desirably has a free-form surface. Thus, screen distortion that occurs at windshield 220 can be corrected in an excellent manner, whereby an image with reduced screen distortion can be visually recognized over the entire region of viewpoint region 300 of observer D.

Second lens 123 of head-up display 100 according to the first exemplary embodiment desirably has its shape set or is disposed as being shifted, so that power is greater on the vehicularly inner side than on the vehicularly outer side. Thus, screen distortion that occurs at windshield 220 with great curvature on the vehicularly outer side can be corrected in an excellent manner, whereby an image with reduced screen distortion can be visually recognized over the entire region of viewpoint region 300 of observer D.

Second lens 123 of head-up display 100 according to the first exemplary embodiment desirably has greater power in the vehicularly right-left direction than in the vehicularly front-rear direction. Thus, screen distortion that occurs at windshield 220 can be corrected in an excellent manner, whereby an image with reduced screen distortion can be visually recognized over the entire region of viewpoint region 300.

Second Exemplary Embodiment

In the following, with reference to FIG. 7, a second exemplary embodiment will be described.

[2-1. Structure]

[2-1-1. Overall Structure of Head-Up Display]

Figure 7:
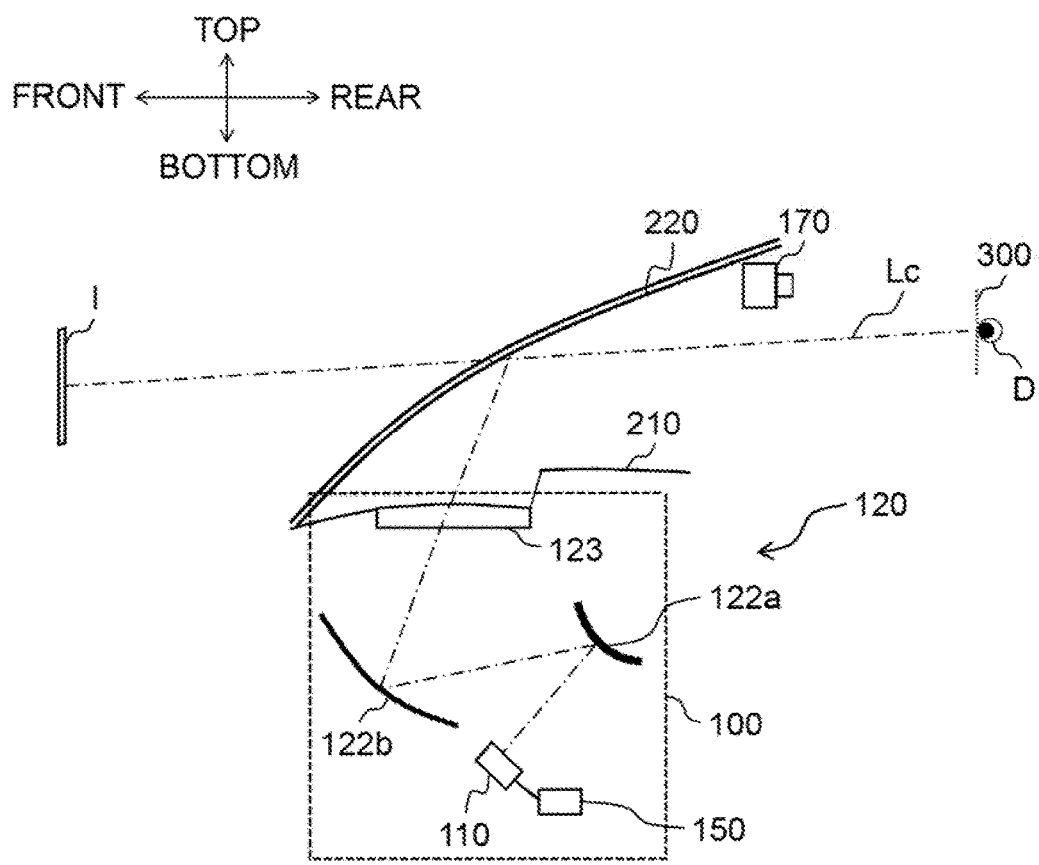
FIG. 7 is a schematic diagram showing the structure of a head-up display according to a second exemplary embodiment.

FIG. 7 is a schematic diagram for describing the structure of head-up display 100 according to a second exemplary embodiment. As shown in FIG. 7, head-up display 100 according to the second exemplary embodiment includes display device 110 and projection optical system 120 (first mirror 122a, second mirror 122b, second lens 123). Head-up display 100 projects displayed image 111 displayed by display device 110 on windshield 220 thereby guiding displayed image 111 to viewpoint region 300 so that observer D visually recognizes virtual image I.

Here, an optical path of displayed image 111 forming the center of virtual image I is defined as reference beam Lc. Note that, it is assumed that the viewpoint of observer D is at the center of viewpoint region 300.

Projection optical system 120 is structured by first mirror 122a, second mirror 122b, and second lens 123. Projection optical system 120 projects displayed image 111 displayed by display device 110 on windshield 220. Specifically, image light of displayed image 111 displayed by display device 110 is input to first mirror 122a. Image light reflected by first mirror 122a is input to second mirror 122b. Image light reflected by second mirror 122b is projected on windshield 220 via second lens 123.

[2-1-2. Structure of Projection Optical System]

First mirror 122a is disposed to be higher than display device 110, having its reflection surface eccentrically disposed so as to reflect a beam output from display device 110 toward second mirror 122b. Here, the reflection surface of first mirror 122a is convex. Thus, asymmetric distortion that occurs at second mirror 122b can be excellently corrected. However, first mirror 122a is not limited to be convex, and may be flat or concave. Further, a free-form surface is employed for first mirror 122a. This is to correct distortion of a virtual image due to reflection, so that excellent virtual image I can be observed over the entire region of viewpoint region 300. However, first mirror 122a is not limited to have a free-form surface, and may be spherical, aspheric, toroidal, or anamorphic. Further, such a mirror may be eccentrically disposed relative to reference beam Lc.

Second mirror 122b is disposed on the front side of vehicle 200 relative to first mirror 122a, having its reflection surface eccentrically disposed so as to reflect the beam output from first mirror 122a toward windshield 220. The reflection surface of second mirror 122b is concave. Thus, displayed image 111 displayed by display device 110 can be enlarged and visually recognized by observer D as virtual image I. Further, a free-form surface is employed for second mirror 122b. Thus, distortion of virtual image I due to reflection can be corrected so that excellent virtual image I can be observed over the entire region of viewpoint region 300. However, second mirror 122b is not limited to have a free-form surface, and may be spherical, aspheric, toroidal, or anamorphic. Further, such a mirror may be eccentrically disposed relative to reference beam Lc.

Here, the lower end of first mirror 122a is disposed to be higher than the lower end of the reflection surface of second mirror 122b. This allows head-up display 100 to reduce thickness in the top-bottom direction of the vehicle.

Second lens 123 is disposed to be higher than first mirror 122a and second mirror 122b, and refracts a beam toward windshield 220. Further, second lens 123 is disposed as being inclined relative to reference beam Lc. This allows second lens 123 to be disposed almost horizontally, which allows downsizing of the housing of head-up display 100. Further, as a whole, second lens 123 has positive power. Thus, displayed image 111 displayed by display device 110 can be enlarged and visually recognized as virtual image I by observer D. Further, second mirror 122b can be downsized. Further, a free-form surface is employed for second lens 123. Thus, asymmetric screen distortion that occurs at windshield 220 can be corrected. Note that, the surface of second lens 123 is not limited to a free-form surface, and may be spherical, aspheric, toroidal, or anamorphic. Further, second lens 123 has its shape set or is disposed as being shifted, so that the refractive effect is greater in the vehicularly inner direction than in the vehicularly outer direction. For example, second lens 123 may have an asymmetric shape with a greater sag on the vehicularly center side. Alternatively, second lens 123 may be a rotationally symmetric lens having its rotational symmetry axis shifted to the vehicularly outer side. Normally, a windshield of an automobile has a free-form surface whose curvature is greater on the vehicularly outer side. Accordingly, in the case where second lens 123 is almost horizontally disposed, setting great power on the vehicularly inner side can correct asymmetric distortion.

[2-1-3. Electronical Correction]

In the present exemplary embodiment also, similarly to the first exemplary embodiment, memory 152 stores a correction amount parameter for correcting chromatic aberration that occurs at second lens 123. That is, chromatic aberration that occurs at second lens 123 becomes greater in the vehicularly inner direction than in the vehicularly outer direction. Accordingly, virtual image I is visually recognized by observer D as an image with asymmetric chromatic aberration. Then, when displayed image 111 is displayed by display device 110, display device 110 displays displayed image 111 while displacing the display position by pixels in the number corresponding to the correction amount which is previously determined for each wavelength. This reduces chromatic aberration of virtual image I due to chromatic aberration of second lens 123. Further, in connection with electronically correcting chromatic aberration in an image with display device 110, a shift-distance is asymmetric between the vehicularly outer side and the vehicularly inner side relative to the center of displayed image 111. Specifically, memory 152 has a correction amount parameter which is greater at reference inner side image end Di than at reference outer side image end Do. Thus, even when second lens 123 has asymmetric power, virtual image I with reduced chromatic aberration can be visually recognized by observer D. Further, the output surface of second lens 123 has a Fresnel facet. Still further, the Fresnel facet of second lens 123 has ridges that linearly extend in the front-rear direction of vehicle 200. This reduces the thickness of second lens 123, whereby head-up display 100 can be downsized. Note that, the second lens is not limited to a linear Fresnel lens, and may be a Fresnel lens in which grooves are circularly disposed, or may be a bulk lens without any grooves.

[2-2. Effect and Others]

Head-up display 100 according to the second exemplary embodiment projects on windshield 220 of vehicle 200, so as to allow observer D to visually recognize virtual image I. Head-up display 100 includes display device 110, CPU 151, first mirror 122a, second mirror 122b, and second lens 123. Display device 110 has pixels which are formed by subordinate pixels of a plurality of colors, and displays displayed image 111. CPU 151 controls display device 110. Here, in second lens 123 being a refractive optical system, a deflection angle of a beam at reference outer side image end Do that passes through second lens 123 on the outer side in vehicle 200 and a deflection angle of a beam at reference inner side image end Di that passes second lens 123 on the inner side in vehicle 200 differ from each other. Note that, the deflection angle in second lens 123 is an angle between a vector of a beam input to second lens 123 and a vector of a beam output from second lens 123. CPU 151 displays displayed image 111 while displacing asymmetrically, between the right side and the left side of displayed image 111, a red-color image and a blue-color image with reference to a green-color image.

This makes it possible to present virtual image I with reduced chromatic aberration over the entire region of viewpoint region 300. Further, since the present exemplary embodiment does not include first lens 121 which is included in the first exemplary embodiment, correction of chromatic aberration is facilitated.

<Desirable Conditions>

In the following, a description will be given of conditions which are desirably satisfied by head-up display 100 according to first and second exemplary embodiments. Note that, a plurality of preferable conditions are stipulated for head-up display 100 according to the exemplary embodiments, and a structure that satisfies all the conditions is most desirable. However, it is also possible to obtain optical systems that exhibit respective effects by satisfying individual conditions.

Head-up display 100 of the present disclosure desirably satisfies the following Condition (1):

$$1.2 < (\theta 2i \times \theta 1o)/(\theta 2o \times \theta 1i) < 6.0 \tag{1}$$

where $\theta 1i$ is an angle between a vector of a reference inner side beam that is input to windshield 220 and a vector of the reference inner side beam reflected from windshield 220;

$\theta 1o$ is an angle between a vector of a reference outer side beam input to windshield 220 and a vector of the reference outer side beam reflected from windshield 220;

$\theta 2i$ is an angle between a vector of a reference inner side beam Li that is input to second lens 123 and a vector of reference inner side beam Li output from second lens 123; and $\theta 2o$ is an angle between a vector of reference outer side beam Lo input to second lens 123 and a vector of reference outer side beam Lo output from second lens 123.

Condition (1) stipulates the ratio between the refractive effect at second lens 123 of reference outer side beam Lo and reference inner side beam Li and an input angle to windshield 220. With a value smaller than the lower limit of Condition (1), the refractive effect on the vehicularly inner side of second lens 123 degrades, and it becomes difficult to provide head-up display 100 of a small size.

Further, with a value greater than the upper limit of Condition (1), the refractive effect on the vehicularly inner side of second lens 123 becomes excessively strong, and it becomes difficult to excellently correct screen distortion that occurs at windshield 220.

Still further, satisfaction of the following Condition (1)' further enhances the above-described effect:

$$1.6 < (\theta 2i \times \theta 1o)/(\theta 2o \times \theta 1i) < 4.0 \tag{1)'}$$

Still further, satisfaction of the following Condition (1)" further enhances the above-described effect:

$$2.0 < (\theta 2i \times \theta 1o)/(\theta 2o \times \theta 1i) < 3.0 \tag{1)''}$$

Head-up display 100 of the present disclosure desirably satisfies the following Condition (2):

$$1.5 \leq (Mi \times \theta 1o)/(Mo \times \theta 1i) \tag{2}$$

where $\theta 1i$ is an angle between a vector of a reference inner side beam input to windshield 220 and a vector of the reference inner side beam reflected from windshield 220;

$\theta 1o$ is an angle between a vector of a reference outer side beam input to windshield 220 and a vector of the reference outer side beam reflected from windshield 220;

Mi is a shift-distance of a blue-color pixel with reference to a green-color pixel at reference inner side image Di; and Mo is a shift-distance of a blue-color pixel with reference to a green-color pixel at reference outer side image Do.

Condition (2) stipulates the ratio between a shift-distance of a blue-color pixel relative to a green-color pixel at reference inner side image end Di and at reference outer side image end Do, and an input angle of reference inner side beam Li and reference outer side beam Lo to windshield 220. Normally, the curvature of windshield 220 becomes greater toward vehicularly outer side. In order to compensate for screen distortion that occurs at windshield 220, second lens 123 desirably has a greater curvature on the vehicularly inner side. For example, as in Condition (2), the shift-distance of reference inner side image end Di is desirably great. With a value smaller than the lower limit of Condition (2), the shift-distance of reference inner side image end Di becomes insufficient for chromatic aberration that occurs at second lens 123, and it becomes difficult to allow observer D to visually recognize excellent virtual image I. Further, the power of second lens 123 on the vehicularly inner side is reduced for allowing observer D to visually recognize excellent virtual image I, and it becomes difficult to provide head-up display 100 of a small size.

Further, satisfaction of the following Condition (2)' further enhances the above-described effect:

$$1.5 \leq Mi/Mo \leq 6.0 \quad (2)'$$

With a value greater than the upper limit of Condition (2)', the shift-distance at reference inner side image end Di for chromatic aberration that occurs at second lens 123 becomes excessive, and it becomes difficult to allow observer D to visually recognize excellent virtual image I.

Still further, satisfaction of the following Condition (2)'' further enhances the above-described effect:

$$2.0 \leq Mi/Mo \leq 5.0 \quad (2)''$$

Note that, a plurality of preferable conditions are stipulated for head-up display 100 according to the exemplary embodiments, and a structure that satisfies all the conditions is most desirable. However, it is also possible to obtain optical systems that exhibit respective effects by satisfying individual conditions.

NUMERICAL EXAMPLES

In the following, with reference to FIGS. 8A to 11C, Numerical Examples corresponding to the first and second exemplary embodiments will be shown.

Hereinafter, a description will be given of specific examples of head-up display 100 of the present disclosure. Note that, in the following Examples, the unit of length in tables is (mm) and the unit of angle is (degrees). Further, the free-form surface is defined by the following mathematic expression:

$$z = \frac{cr^2}{1 + \sqrt{1 - (1+k)c^2 r^2}} + \sum_{m,n} C_j x^m y^n \quad \text{[Mathematic Expression 1]}$$

$$(m \geq 0, n \geq 0, m+n > 0)$$

$$j = \frac{(m+n)^2 + m + 3n}{2} + 1$$

where z is a sag at position (x, y) from axes defining a surface, r is a radius of curvature at the origin on the axes defining a surface, c is a curvature at the origin on the axes defining a surface, k is a Korenich constant which corresponds to $C_1$ of the polynomial coefficient, Cj (j>1) is a coefficient of monomial $x^m y^n$, and m and n are each an integer equal to or greater than 0.

Further, in Examples, the coordinate origin being the reference is the center of an image (display surface) displayed on display device 110. In the tables, the horizontal direction in a display surface is X-axis, the vertical direction in a display surface is Y-axis, and the direction perpendicular to a display surface is Z-axis. Further, in eccentricity data, ADE refers to an amount of rotation of a mirror or a lens from Z-axis direction to Y-axis direction about X-axis; BDE refers to an amount of rotation from X-axis direction to Z-axis direction about Y-axis; and CDE refers to an amount of rotation from X-axis direction to Y-axis direction about Z-axis.

Numerical Example 1

FIGS. 8A to 9C show data of the projection optical system of Example 1 (the first exemplary embodiment). FIG. 8A shows eccentricity data at surfaces of the optical elements of projection optical system 120. FIGS. 8B and 8C show radius of curvature. FIGS. 9A to 9C show polynomial coefficients of free-form surfaces of the optical elements.

Numerical Example 2

FIGS. 10A to 11C show data of the projection optical system of Example 2 (the second exemplary embodiment). FIG. 10A shows eccentricity data at surfaces of the optical elements of projection optical system 120. FIGS. 10B and 10C show radius of curvature. Further, FIGS. 11A to 11C show polynomial coefficients of free-form surfaces of the optical elements.

In the following Table 1, corresponding values of Conditional Expressions (1), (2) of the first and second exemplary embodiments are shown.

TABLE 1

|  | Example 1 | Example 2 |
|---|---|---|
| Conditional Expression (1) | 2.56 | 2.32 |
| Conditional Expression (2) | 3.05 | 2.58 |

Other Exemplary Embodiments

In the foregoing, the description has been given of the first and second exemplary embodiments as illustrations of the technique disclosed in the present application. However, the technique disclosed in the present disclosure is not limited thereto, and is applicable to any exemplary embodiment obtained by making changes, replacement, addition, omission and the like. Further, it is also possible to newly obtain an exemplary embodiment through combination of the structure elements described in the first and second exemplary embodiments.

In the first and second exemplary embodiments, second lens 123 is structured such that a deflection angle of a beam at an end of an image passing through second lens 123 on the vehicularly inner side is greater than a deflection angle of a beam at an end of an image passing through second lens 123 on the vehicularly outer side. In order to implement this optical path, second lens 123 may be an asymmetric lens, or symmetric lens is arranged eccentrically with respect to reference beam Lc as second lens 123.

Further, in the first and second exemplary embodiments, while second lens 123 is a Fresnel lens or a linear lens, it may be a lens having a Fresnel facet with uneven thickness.

Still further, in the first and second exemplary embodiments, while one or two lens elements are used in projection optical system 120, three or more lens elements may be used.

Still further, in the first and second exemplary embodiments, while second lens 123 has a Fresnel facet on the upper side, the Fresnel facet may be disposed on the lower side.

In the first and second exemplary embodiments, while second lens 123 has been described to have a free-form surface, it may be spherical, aspheric, toroidal, or anamorphic.

Further, in the first and second exemplary embodiments, while second lens 123 has been described as a linear Fresnel lens, it may be a Fresnel lens in which grooves are circularly disposed, or a bulk lens without any grooves.

Still further, in the first exemplary embodiment, while it has been described that the surface of first lens 121 on display device 110 side is entirely concave, it may be partially convex.

Still further, in the first exemplary embodiment, while the first lens 121 has been described as a negative meniscus lens, the first lens 121 may have flat and concave surfaces, or both the surfaces may be concave.

Still further, in the first exemplary embodiment, while first lens 121 has been described to have a free-form surface, it may be spherical, aspheric, toroidal, or anamorphic. Further, such a lens may be eccentrically disposed relative to reference beam Lc.

Still further, in the first exemplary embodiment, the surface of mirror 122 is not limited to a free-form surface, and it may be spherical, aspheric, toroidal, or anamorphic. Further, mirror 122 may be eccentrically disposed relative to reference beam Lc.

Still further, in the first exemplary embodiment, while one first lens 121 is disposed on the next to output side of display device 110, a plurality of lens elements may be disposed.

Still further, in the first exemplary embodiment, while one mirror 122 is disposed on the next to output side of first lens 121, a plurality of mirrors may be disposed.

Still further, in the first exemplary embodiment, while one second lens 123 is disposed on the next to output side of mirror 122, a plurality of lens elements may be disposed, or lens elements may not be disposed.

Still further, in the second exemplary embodiment, while two mirrors are disposed in projection optical system 120, three or more mirrors may be disposed. Further, while first mirror 122a is disposed on the vehicularly rear side relative to second mirror 122b, the present disclosure is not limited thereto. First mirror 122a may be disposed on the vehicularly front side relative to second mirror 122b, or may be disposed in the vehicularly right-left direction (the direction perpendicular to FIG. 4). Still further, in the second exemplary embodiment, while display device 110 is disposed to be lower than first mirror 122a, the present disclosure is not limited thereto. For example, display device 110 may be disposed to be higher than first mirror 122a, or may be disposed on the vehicularly rear side or in the vehicularly right-left direction (the direction perpendicular to FIG. 4).

Note that, the exemplary embodiments described above are illustrations of the technique of the present disclosure. Therefore, various changes, replacement, addition, or omission may be made to the exemplary embodiments within the scope of claims or their equivalents.

The present disclosure is applicable to a vehicular head-up display having a transparent reflective member and the like.

What is claimed is:

1. A head-up display mounted on a vehicle having a windshield for projecting an image on the windshield to allow an observer to visually recognize a virtual image, the head-up display comprising:
    a display device that has pixels including a first-color subordinate pixel and a second-color subordinate pixel and displays an image;
    a processor that controls display of the display device; and
    a projection optical system that has a refractive optical system, and projects the image displayed on the display device on a viewpoint region of an observer,
    wherein in relation to a deflection angle between a vector of a beam input to the refractive optical system and a vector of a beam output from the refractive optical system, the deflection angle of a beam at a reference outer side image end passing through an outer side in the refractive optical system with reference to the vehicle and the deflection angle of a beam at a reference inner side image end passing through an inner side in the refractive optical system with reference to the vehicle differ from each other, and
    the processor asymmetrically shifts, between the reference outer side image end and the reference inner side image end with reference to a center, a pixel of an image formed by the second-color subordinate pixel relative to an image formed by the first-color subordinate pixel.

2. The head-up display according to claim 1 satisfying a condition (1):

$$1.2 < (\theta 2i \times \theta 1o)/(\theta 2o \times \theta 1i) \tag{1}$$

where
$\theta 1i$ is an angle between a vector of a reference inner side beam that is input to the windshield and a vector of the reference inner side beam reflected from the windshield;
$\theta 1o$ is an angle between a vector of a reference outer side beam that is input to the windshield and a vector of the reference outer side beam reflected from the windshield;
$\theta 2i$ is an angle between a vector of a reference inner side beam that is input to a refractive optical system and a vector of the reference inner side beam output from the refractive optical system; and
$\theta 2o$ is an angle between a vector of a reference outer side beam that is input to the refractive optical system and the reference outer side beam that is output from the refractive optical system.

3. The head-up display according to claim 1, wherein
the first-color is green-color;
the second-color is blue-color; and
the head-up display satisfies a condition (2):

$$1.5 \leq (Mi \times \theta 1o)/(Mo \times \theta 1i) \tag{2}$$

where
Mi is a shift-distance of the second-color pixel with reference to the first-color pixel at a reference inner side image being an end of an image reaching an inner side of a virtual image; and
Mo is a shift-distance of the second-color pixel with reference to the first-color pixel at a reference outer side image being an end of an image reaching an outer side of a virtual image.

4. The head-up display according to claim 1, wherein
the refractive optical system has a greater curvature in a vehicularly front-rear direction than in a vehicularly right-left direction.

5. The head-up display according to claim 1, wherein
the refractive optical system is arranged eccentrically with respect to a reference beam that passes through a center of the image.

6. The head-up display according to claim 1, wherein the refractive optical system is eccentric relative to a reference beam that passes through a center of the image.

7. A vehicle comprising the head-up display according to claim 1.

* * * * *